United States Patent
Zhang et al.

(10) Patent No.: US 9,905,031 B2
(45) Date of Patent: Feb. 27, 2018

(54) METHOD AND RELATED APPARATUS FOR CAPTURING AND PROCESSING IMAGE DATA

(71) Applicant: Huawei Technologies Co., Ltd., Shenzhen (CN)

(72) Inventors: Lei Zhang, Beijing (CN); Qingpeng Xie, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 3 days.

(21) Appl. No.: 15/289,582

(22) Filed: Oct. 10, 2016

(65) Prior Publication Data

US 2017/0024920 A1  Jan. 26, 2017

Related U.S. Application Data

(63) Continuation of application No. PCT/CN2015/076379, filed on Apr. 10, 2015.

(30) Foreign Application Priority Data

May 9, 2014  (CN) .......................... 2014 1 0195438

(51) Int. Cl.
*G06T 11/60* (2006.01)
*H04N 5/232* (2006.01)
(Continued)

(52) U.S. Cl.
CPC .......... *G06T 11/60* (2013.01); *G06K 9/00228* (2013.01); *G06K 9/00234* (2013.01);
(Continued)

(58) Field of Classification Search
CPC .. G06T 11/60; G06T 7/00; G06T 7/20; G06K 9/00228; G06K 9/00234; G06K 9/00261;
(Continued)

(56) References Cited

U.S. PATENT DOCUMENTS 6,183,916 B1   2/2001  Kuo et al.
2008/0246777 A1  10/2008  Swanson et al.
(Continued)

FOREIGN PATENT DOCUMENTS

CN   101303701 A   11/2008
CN   101976436 A   2/2011
(Continued)

OTHER PUBLICATIONS

Machine Translation and Abstract of Chinese Patent Application No. CN101976436, Feb. 16, 2011, 11 pages.
(Continued)

*Primary Examiner* — David F Dunphy
(74) *Attorney, Agent, or Firm* — Conley Rose, P.C.

(57) ABSTRACT

A method for processing image data includes obtaining at least two captured images, where focal points of the obtained captured images are different; obtaining a focus-capture parameter, and fusing the captured images according to the focus-capture parameter to obtain a fused image; and performing joint coding on the fused image, and outputting an image; where when registration, mapping, cutting, and fusion are performed on the captured images according to the focus-capture parameter, a mask image is corrected through analysis of motion information of the captured images, and images are selected; and the corrected mask image includes a sequence number of a captured image selected at each pixel in the connected motion object region after the captured images are marked with sequence numbers. The method is used to implement high-efficiency and high-quality image processing.

20 Claims, 13 Drawing Sheets

Fused image in which motion objects are not detected

Fused image in which motion objects are detected

(51) Int. Cl.
*G06K 9/00* (2006.01)
*G06T 7/20* (2017.01)
*G06T 7/00* (2017.01)

(52) U.S. Cl.
CPC ..... *G06K 9/00261* (2013.01); *G06K 9/00268* (2013.01); *G06T 7/00* (2013.01); *G06T 7/20* (2013.01); *H04N 5/23212* (2013.01); *H04N 5/23219* (2013.01)

(58) Field of Classification Search
CPC ........... G06K 9/00268; H04N 5/23212; H04N 5/23219
See application file for complete search history.

(56) References Cited

U.S. PATENT DOCUMENTS

| | | | |
|---|---|---|---|
| 2009/0244354 A1* | 10/2009 | Sakaguchi | H04N 5/23293 348/333.02 |
| 2010/0283868 A1 | 11/2010 | Clark et al. | |
| 2011/0141239 A1* | 6/2011 | Kennedy | H04N 13/0235 348/47 |
| 2011/0200259 A1 | 8/2011 | Lindskog et al. | |
| 2012/0188394 A1* | 7/2012 | Park | H04N 5/23212 348/222.1 |
| 2012/0194686 A1 | 8/2012 | Lin et al. | |
| 2013/0063625 A1 | 3/2013 | Yamanaka | |
| 2013/0223759 A1* | 8/2013 | Nishiyama | G06T 5/50 382/284 |
| 2013/0308036 A1* | 11/2013 | Peng | H04N 5/23212 348/345 |
| 2014/0267833 A1* | 9/2014 | Chen | G06T 5/003 348/239 |
| 2015/0009391 A1* | 1/2015 | Kim | H04N 5/23216 348/333.05 |

FOREIGN PATENT DOCUMENTS

| | | |
|---|---|---|
| CN | 102542545 A | 7/2012 |
| CN | 102833487 A | 12/2012 |
| CN | 102930251 A | 2/2013 |
| CN | 102968792 A | 3/2013 |

OTHER PUBLICATIONS

Machine Translation and Abstract of Chinese Patent Application No. CN102542545, Jul. 4, 2012, 6 pages.
Foreign Communication From a Counterpart Application, PCT Application No. PCT/CN2015/076379, English Translation of International Search Report dated Jul. 10, 2015, 2 pages.
Foreign Communication From a Counterpart Application, PCT Application No. PCT/CN2015/076379, English Translation of Written Opinion dated Jul. 10, 2015, 5 pages.
Machine Translation and Abstract of Chinese Publication No. CN101303701, Nov. 12, 2008, 24 pages.
Machine Translation and Abstract of Chinese Publication No. CN102968792, Mar. 13, 2013, 20 pages.
Foreign Communication From a Counterpart Application, Chinese Application No. 201410195438.X, Chinese Office Action dated Sep. 1, 2017, 5 pages.

* cited by examiner

Fused image in which motion objects are not detected

Fused image in which motion objects are detected

Fused image in which motion objects are not detected

Fused image in which motion objects are detected

METHOD AND RELATED APPARATUS FOR CAPTURING AND PROCESSING IMAGE DATA

CROSS-REFERENCE TO RELATED APPLICATIONS

This application is a continuation of International Application No. PCT/CN2015/076379, filed on Apr. 10, 2015, which claims priority to Chinese Patent Application No. 201410195438.X, filed on May 9, 2014, both of which are hereby incorporated by reference in their entireties.

TECHNICAL FIELD

The present disclosure relates to the image processing field, and in particular, to a method for capturing and processing image data and a related apparatus.

BACKGROUND

With continuous development of information technologies, electronic terminals (such as mobile phones and cameras) begin to support image processing. Electronic terminals are ubiquitously used for photographing. However, in a photographing process, for a scene with different depths of field, only a depth of field can be selected for focusing and capturing, and this causes other regions to be relatively unclear. In the prior art, a camera may be used to capture images with different depths of field, and then image fusion is performed according to a related image processing method such that a full-definition image is obtained on a display terminal.

For example, in the prior art, an image is selected from a group of multi-focus photos and copied as a target photo. Then, definitions of pixels in a same position in the target photo and other photos in the group of multi-focus photos are compared, and a highest-definition pixel is used to replace a pixel in the same position in the target photo. This technical solution only provides a fusion policy using a highest-definition pixel for replacement after capture, and is applicable only to still image processing.

For another example, a pixel-level multi-focus image fusion method based on correction of a differential image is disclosed in Chinese patent application No. 201010507977.4 in the prior art. First, down-sampling is performed on images to be fused, and spatial frequencies of the down-sampled images to be fused are calculated. Then an initial fused image is obtained by comparing the spatial frequencies. Then correction is performed twice on a differential image between the initial fused image and the down-sampled images to be fused, where the first correction uses median filtering and is used to eliminate isolated pixels that are selected incorrectly, and the second correction is to merge regions by calculating areas of the regions, and finally, interpolation amplification is performed on an obtained image that is corrected twice, a final marked image is obtained, and a fused image may be obtained according to the marked image. In this technical solution, down-sampling needs to be performed on the images, and after fusion, interpolation processing also needs to be performed. In addition, this technical solution is also applicable to still image processing only.

The image processing methods for electronic terminals in the prior art are either too simple and cause a poor image processing effect, or too complex and cause low image processing efficiency, and are generally applicable to still image processing only. People are always concerned about how to perform high-efficiency and high-quality image processing on an electronic terminal to obtain a high-definition image required by a user.

SUMMARY

To resolve the foregoing technical problems, embodiments of the present disclosure provide a method for capturing and processing image data, a method for processing image data, an apparatus for capturing and processing image data, and an apparatus for processing image data in order to resolve a motion object scene fusion problem and implement high-efficiency and high-quality image processing.

According to a first aspect, an embodiment of the present disclosure provides a method for processing image data, where the method includes obtaining at least two captured images, where focal points of the obtained captured images are different, obtaining a focus-capture parameter, and fusing the captured images according to the focus-capture parameter to obtain a fused image, performing joint coding on the fused image, and outputting an image, where when registration, mapping, cutting, and fusion are performed on the captured images according to the focus-capture parameter, a mask image is corrected through analysis of motion information of the captured images, and images are selected according to a corrected mask image for image fusion, and the motion information includes a connected motion object region formed by a motion track of an object moving between the captured images, and the corrected mask image includes a sequence number of a captured image selected at each pixel in the connected motion object region after the captured images are marked with sequence numbers.

With reference to the first aspect, in a first possible implementation manner, obtaining at least two captured images includes setting a quantity of focal points in an image scene to M, where M is a natural number that is greater than 1, detecting face regions in the image scene to obtain L face regions, where L is zero or a positive integer, and selecting the L face regions as focal points to focus on and capture the image scene when M is equal to L, selecting the L face regions and M−L regions of interest as focal points to focus on and capture the image scene when M is greater than L, or analyzing areas of the L face regions when M is less than L, selecting face regions from the L face regions in order of first selecting a face region with a largest area and then selecting a face region with a smallest area as focal points, and after the selected face regions are precluded, performing this step repeatedly until M face regions are selected as focal points to focus on and capture the image scene.

With reference to the first aspect, in a second possible implementation manner, obtaining at least two captured images includes setting a quantity of focal points in an image scene to M, where M is a natural number that is greater than 1, and M is less than or equal to a quantity of video frames obtained by a camera in an image capture process, dividing the image scene into A regions, where A is a positive integer, detecting face regions in the image scene to obtain L face regions, where L is zero or a positive integer, and selecting the L face regions as focal points to focus on and capture the image scene when M is equal to L, analyzing areas of the L face regions when M is less than L, selecting face regions from the L face regions in order of first selecting a face region with a largest area and then selecting a face region with a smallest area as focal points, and performing this step repeatedly until M face regions are selected as focal points to focus on and capture the image scene after the selected face regions are precluded, or selecting the L face regions as focal points when M is greater than L, and selecting M−L regions from the A regions in descending order of areas of highest-definition regions of the A regions in each video frame as focal points to focus on and capture the image scene, where a highest-definition region comprises a region with a largest signal-to-noise ratio, or a largest gradient, or a largest direct current (DC) value.

With reference to the first aspect, in a third possible implementation manner, the fused image includes at least one of the captured images, processed images obtained after registration, mapping, and cutting are performed on the captured images, or the fused image obtained after registration, mapping, cutting, and fusion are performed on the captured images, and fusing the captured images according to the focus-capture parameter includes determining, according to the focus-capture parameter, whether to fuse the captured images, and selecting an image from the captured images according to a quantity of successfully captured images when a determining result is not to fuse the captured images, and performing registration, mapping, and cutting processing on the captured images to obtain the processed images, or performing registration, mapping, cutting, and fusion on the captured images to obtain the fused image when the determining result is to fuse the captured images.

With reference to the third possible implementation manner of the first aspect, in a fourth possible implementation manner, selecting an image from the captured images according to a quantity of successfully captured images includes selecting, from the captured images, an image that is focused and captured successfully when the quantity of successfully captured images is 1, and selecting, from the captured images, an image with a largest signal-to-noise ratio, or a largest gradient, or a largest DC value when the quantity of successfully captured images is not 1.

With reference to the third possible implementation manner of the first aspect, in a fifth possible implementation manner, the focus-capture parameter includes a time value from starting of focusing to ending of focusing of each captured image, and determining, according to the focus-capture parameter, whether to fuse the captured images, includes sorting the time values, and determining that captured images corresponding to the two time values need to be fused when an absolute value of a difference between two adjacent time values from small to large in sequence is greater than a preset threshold, or determining that captured images corresponding to the two time values do not need to be fused when an absolute value of a difference between two adjacent time values from small to large in sequence is not greater than a preset threshold, discarding a larger time value in the two time values, and performing this step repeatedly until all captured images that need to be fused are determined.

With reference to the third possible implementation manner of the first aspect, in a sixth possible implementation manner, the focus-capture parameter includes a length value of lens stretching from starting of focusing to ending of focusing of each captured image, and the determining, according to the focus-capture parameter, whether to fuse the captured images, includes sorting the length values, and determining that captured images corresponding to the two length values need to be fused when an absolute value of a difference between two adjacent length values from small to large in sequence is greater than a preset threshold, or determining that captured images corresponding to the two length values do not need to be fused when an absolute value of a difference between two adjacent length values from small to large in sequence is not greater than a preset threshold, discarding a larger length value in the two length values, and performing this step repeatedly until all captured images that need to be fused are determined.

With reference to the third possible implementation manner of the first aspect, in a seventh possible implementation manner, performing registration, mapping, and cutting processing on the captured images includes performing registration processing on all the obtained captured images according to a first image, where the first image is an image in all the obtained captured images, performing mapping processing on all the captured images after registration processing, to obtain mapped images, and performing cutting processing on all the obtained mapped images and the first image.

With reference to the third possible implementation manner of the first aspect, in an eighth possible implementation manner, performing the joint coding on the fused image, and outputting an image includes performing joint coding on the fused image, receiving a display region selection instruction, obtaining, according to a region selected using the display region selection instruction, an image that needs to be decoded and displayed, and decoding and displaying the obtained image that needs to be decoded and displayed.

With reference to the eighth possible implementation manner of the first aspect, in a ninth possible implementation manner, obtaining, according to a region selected using the display region selection instruction, an image that needs to be decoded and displayed, includes finding, from the focal points of the captured images, a focal point that is closest to the region selected using the display region selection instruction, and obtaining an image that is focused and captured according to the found focal point and undergoes image registration, mapping, cutting processing, and joint coding, or obtaining an image that is focused and captured according to the found focal point and undergoes image registration, mapping, cutting, fusion, and joint coding, as the image that needs to be decoded and displayed.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect, or the seventh possible implementation manner of the first aspect, or the eighth possible implementation manner of the first aspect, or the ninth possible implementation manner of the first aspect, in a tenth possible implementation manner, performing registration, mapping, cutting, and fusion on the captured images includes performing registration processing on all the obtained captured images according to a first image, where the first image is an image in all the obtained captured images, performing mapping processing on all the captured images after registration processing, to obtain mapped images, performing cutting processing on all the obtained mapped images and the first image, converting the images after cutting processing to obtain grey images, performing smooth denoising, performing joint object segmentation on the grey images, marking each region, generating a mask image by collecting statistics of gradient information of each region, performing smooth denoising on processed images with a largest gradient in each region according to the mask image, obtaining a differential image between the processed images through calculation, marking a motion object region according to the differential image, correcting the mask image according to corresponding selection ratios for the mask image in a connected motion object region, where the selection ratios for the mask image are ratios of areas of different images selected for the mask image in the connected motion object region to a total area of the connected motion object region, and selecting images according to the corrected mask image to perform image fusion.

With reference to the tenth possible implementation manner of the first aspect, in an eleventh possible implementation manner, correcting the mask image according to corresponding selection ratios for the mask image in a connected motion object region includes correcting the mask image by selecting an image corresponding to a largest ratio in the selection ratios for the mask image when detecting that the corresponding selection ratios for the mask image in the connected motion object region are all less than a preset threshold.

According to a second aspect, an embodiment of the present disclosure provides an apparatus for processing image data, where the apparatus includes an image obtaining module configured to obtain at least two captured images, where focal points of the obtained captured images are different, an image fusion module configured to obtain a focus-capture parameter, and fuse the captured images according to the focus-capture parameter to obtain a fused image, and a coding and outputting module configured to perform joint coding on the fused image, and output an image, where when performing registration, mapping, cutting, and fusion on the captured images according to the focus-capture parameter, the image fusion module corrects a mask image through analysis of motion information of the captured images, and selects images according to a corrected mask image to perform image fusion, and the motion information includes a connected motion object region formed by a motion track of an object moving between the captured images, and the corrected mask image includes a sequence number of a captured image selected at each pixel in the connected motion object region after the captured images are marked with sequence numbers.

With reference to the second aspect, in a first possible implementation manner, the image obtaining module includes a focal point quantity first setting unit configured to set a quantity of focal points in an image scene to M, where M is a natural number that is greater than 1, a face region first detection unit configured to detect face regions in the image scene to obtain L face regions, where L is zero or a positive integer, and a first focus-capture unit configured to select the L face regions as focal points to focus on and capture the image scene when M is equal to L, select the L face regions and M−L regions of interest as focal points to focus on and capture the image scene when M is greater than L, or analyze areas of the L face regions when M is less than L, select face regions from the L face regions in order of first selecting a face region with a largest area and then selecting a face region with a smallest area as focal points, and perform this step repeatedly until M face regions are selected as focal points to focus on and capture the image scene after the selected face regions are precluded.

With reference to the second aspect, in a second possible implementation manner, the image obtaining module includes a focal point quantity second setting unit configured to set a quantity of focal points in an image scene to M, where M is a natural number that is greater than 1, and M is less than or equal to a quantity of video frames obtained by a camera in an image capture process, a region division unit configured to divide the image scene into A regions, where A is a natural number, a face region second detection unit configured to detect face regions in the image scene to obtain L face regions, where L is zero or a positive integer, and a second focus-capture unit configured to select the L face regions as focal points to focus on and capture the image scene when M is equal to L, analyze areas of the L face regions when M is less than L, select face regions from the L face regions in order of first selecting a face region with a largest area and then selecting a face region with a smallest area as focal points, and perform this step repeatedly until M face regions are selected as focal points to focus on and capture the image scene after the selected face regions are precluded, or select the L face regions as focal points when M is greater than L, and select M−L regions from the A regions in descending order of areas of highest-definition regions of the A regions in each video frame as focal points to focus on and capture the image scene, where a highest-definition region comprises a region with a largest signal-to-noise ratio, or a largest gradient, or a largest DC value.

With reference to the second aspect, in a third possible implementation manner, the fused image includes at least one of the captured images, processed images obtained after registration, mapping, and cutting are performed on the captured images, or the fused image obtained after registration, mapping, cutting, and fusion are performed on the captured images, and the image fusion module includes a fusion determining unit configured to determine, according to the focus-capture parameter, whether to fuse the captured images, a fusion determining first processing unit configured to select an image from the captured images according to a quantity of successfully captured images when a determining result is not to fuse the captured images, and a fusion determining second processing unit configured to perform registration, mapping, and cutting processing on the captured images to obtain the processed images, or perform registration, mapping, cutting, and fusion on the captured images to obtain the fused image when a determining result is to fuse the captured images.

With reference to the third possible implementation manner of the second aspect, in a fourth possible implementation manner, the fusion determining first processing unit includes a first selection subunit configured to select, from the captured images, an image that is focused and captured successfully when the quantity of successfully captured images is 1, and a second selection subunit configured to select, from the captured images, an image with a largest signal-to-noise ratio, or a largest gradient, or a largest DC value when the quantity of successfully captured images is not 1.

With reference to the third possible implementation manner of the second aspect, in a fifth possible implementation manner, the focus-capture parameter includes a time value from starting of focusing to ending of focusing of each captured image, and the fusion determining unit is configured to sort the time values, and determine that captured images corresponding to the two time values need to be fused when an absolute value of a difference between two adjacent time values from small to large in sequence is greater than a preset threshold, or determine that captured images corresponding to the two time values do not need to be fused when an absolute value of a difference between two adjacent time values from small to large in sequence is not greater than a preset threshold, discard a larger time value in the two time values, and perform this step repeatedly until all captured images that need to be fused are determined.

With reference to the third possible implementation manner of the second aspect, in a sixth possible implementation manner, the focus-capture parameter includes a length value of lens stretching from starting of focusing to ending of focusing of each captured image, and the fusion determining unit is configured to sort the length values, and determine that captured images corresponding to the two length values need to be fused when an absolute value of a difference between two adjacent length values from small to large in sequence is greater than a preset threshold, or determine that captured images corresponding to the two length values do not need to be fused when an absolute value of a difference between two adjacent length values from small to large in sequence is not greater than a preset threshold, discard a larger length value in the two length values, and perform this step repeatedly until all captured images that need to be fused are determined.

With reference to the third possible implementation manner of the second aspect, in a seventh possible implementation manner, the fusion determining second processing unit includes a registration, mapping, and cutting subunit configured to perform registration, mapping, and cutting processing on the captured images to obtain the processed images, where the registration, mapping, and cutting subunit includes a first registration processing subunit configured to perform, according to a first image, registration processing on all the captured images obtained by the image obtaining module, where the first image is an image in all the captured images, a first mapping processing subunit configured to perform mapping processing on all the captured images after registration processing, to obtain mapped images, and a first cutting processing subunit configured to perform cutting processing on all the obtained mapped images and the first image.

With reference to the third possible implementation manner of the second aspect, in an eighth possible implementation manner, coding and outputting module includes a joint coding unit configured to perform joint coding on the fused image, a selection instruction receiving unit configured to receive a display region selection instruction, and obtain, according to a region selected using the display region selection instruction, an image that needs to be decoded and displayed, and a decoding and displaying unit configured to decode and display the obtained image that needs to be decoded and displayed.

With reference to the eighth possible implementation manner of the second aspect, in a ninth possible implementation manner, the selection instruction receiving unit includes a focal point finding subunit configured to find, from the focal points of the captured images, a focal point that is closest to the region selected using the display region selection instruction, and an image obtaining subunit configured to obtain an image that is focused and captured according to the found focal point and undergoes image registration, mapping, cutting processing, and joint coding, or obtain an image that is focused and captured according to the found focal point and undergoes image registration, mapping, cutting, fusion, and joint coding, as the image that needs to be decoded and displayed.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect, or the seventh possible implementation manner of the second aspect, or the eighth possible implementation manner of the second aspect, or the ninth possible implementation manner of the second aspect, in a tenth possible implementation manner, the image fusion module includes a second registration processing unit configured to perform, according to a first image, registration processing on all the captured images obtained by the image obtaining module, where the first image is an image in all the captured images, a second mapping processing unit configured to perform mapping processing on all the captured images after registration processing, to obtain mapped images, a second cutting processing unit configured to perform cutting processing on all the obtained mapped images and the first image, a converting and denoising unit configured to convert the images after the second cutting processing unit performs cutting processing, to obtain grey images, and perform smooth denoising, a mask image generation unit configured to perform joint object segmentation on the grey images, mark each region, and generate a mask image by collecting statistics of gradient information of each region, a motion region marking unit configured to perform smooth denoising on processed images with a largest gradient in each region according to the mask image, obtain a differential image between the processed images through calculation, and mark a motion object region according to the differential image, a correction unit configured to correct the mask image according to corresponding selection ratios for the mask image in a connected motion object region, where the selection ratios for the mask image are ratios of areas of different images selected for the mask image in the connected motion object region to a total area of the connected motion object region, and a fusion unit configured to select images according to the corrected mask image to perform image fusion.

With reference to the tenth possible implementation manner of the second aspect, in an eleventh possible implementation manner, the correction unit is configured to correct the mask image by selecting an image corresponding to a largest ratio in the selection ratios for the mask image when it is detected that the corresponding selection ratios for the mask image in the connected motion object region are all less than a preset threshold.

In implementation of the embodiments of the present disclosure, captured images are fused according to a focus-capture parameter, and when registration, mapping, cutting, and fusion are performed on the captured images according to the focus-capture parameter, a mask image is corrected through analysis of motion information of the captured images, and images are selected according to a corrected mask image for image fusion. Therefore, a motion object scene fusion problem is solved, and high-efficiency and high-quality image processing is implemented. Further, a problem that image processing methods for electronic terminals in the prior art are either too simple and cause a poor image processing effect, or too complex and cause low image processing efficiency, may be solved. In addition, multiple focal points are selected automatically or manually for focusing and capturing, and some or all image regions are decoded and displayed according to a user requirement such that an image processing capability of an electronic terminal is improved greatly.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure.

It should be noted that the terms used in the embodiments of the present disclosure are merely for the purpose of illustrating embodiments, and are not intended to limit the present disclosure. The terms "a", "said" and "the" of singular forms used in the embodiments and the appended claims of the present disclosure are also intended to include plural forms, unless otherwise in the context clearly. It should also be understood that, the term "and/or" used herein indicates and includes any or all possible combinations of one or more associated listed items.

Figure 1:
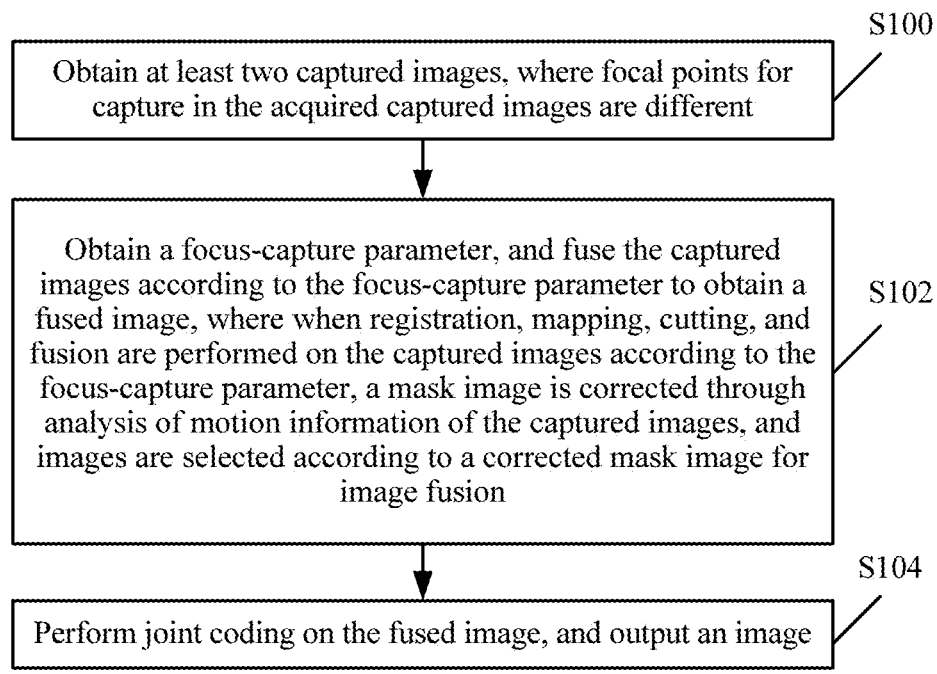
FIG. 1 is a schematic flowchart of a method for processing image data according to an embodiment of the present disclosure.

Referring to FIG. 1, FIG. 1 is a schematic flowchart of a method for processing image data according to an embodiment of the present disclosure, where the method includes the following steps.

Step S100: Obtain at least two captured images, where focal points of the obtained captured images are different.

The at least two captured images may be obtained from a peer electronic terminal, or the at least two captured images may be obtained by a local electronic terminal by capturing images.

Step S102: Obtain a focus-capture parameter, and fuse the captured images according to the focus-capture parameter to obtain a fused image, where when registration, mapping, cutting, and fusion are performed on the captured images according to the focus-capture parameter, a mask image is corrected through analysis of motion information of the captured images, and images are selected according to a corrected mask image for image fusion.

The motion information includes a connected motion object region formed by a motion track of an object moving between the captured images, and the corrected mask image includes a sequence number of a captured image selected at each pixel in the connected motion object region after the captured images are marked with sequence numbers. A mask image is first generated when registration, mapping, cutting, and fusion are performed on the captured images, where a size of the mask image is the same as that of an image input during image fusion, and a value of each pixel of the mask image is a sequence number of a captured image. Then a connected motion object region formed by a motion track of an object moving between the captured images is marked, and each pixel value of the mask image in a corresponding position in the connected motion object region is corrected.

Step S104: Perform joint coding on the fused image, and output an image.

Outputting the jointly coded image includes at least one of the following processing: display, storage, or transmission.

In implementation of the embodiment of the present disclosure, captured images are fused according to a focus-capture parameter, and a mask image is corrected through analysis of motion information of the captured images when registration, mapping, cutting, and fusion are performed on the captured images according to the focus-capture parameter, and images are selected according to a corrected mask image for image fusion. Therefore, a motion object scene fusion problem is solved, high-efficiency and high-quality image processing is implemented, and an image processing capability of an electronic terminal is improved.

Further, when the local electronic terminal obtains the at least two captured images by capturing images, step S100 may be at least two regions in an image scene are determined, and the determined at least two regions are used as focal points to focus on and capture the image scene. At least two regions of an image scene to be photographed may be automatically determined in a display preview window by the electronic terminal in an embodiment of the present disclosure or manually determined by a user, and then the determined at least two regions are used in sequence as focal points to focus on and capture image scene, and the focus-capture parameter is recorded.

Figure 2:
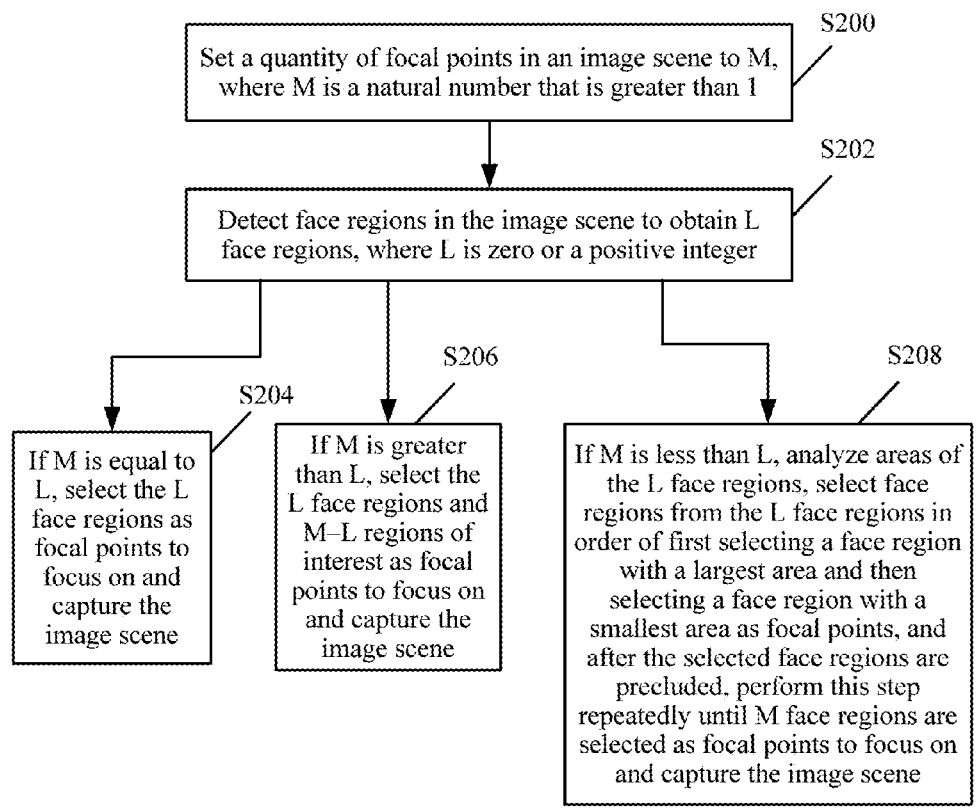
FIG. 2 is a schematic flowchart of a method for focusing and capturing according to an embodiment of the present disclosure.
Figure 3:
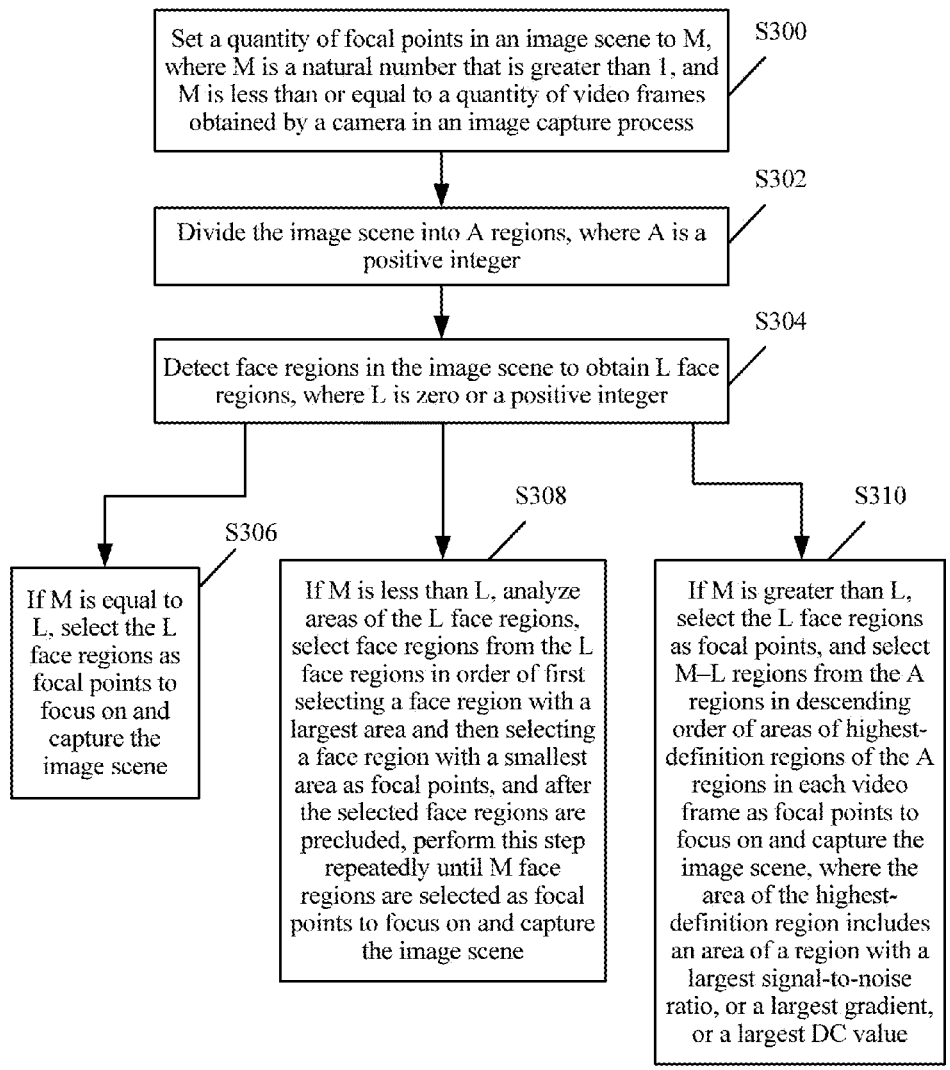
FIG. 3 is a schematic flowchart of another embodiment of a method for focusing and capturing according to an embodiment of the present disclosure.
Figure 4:
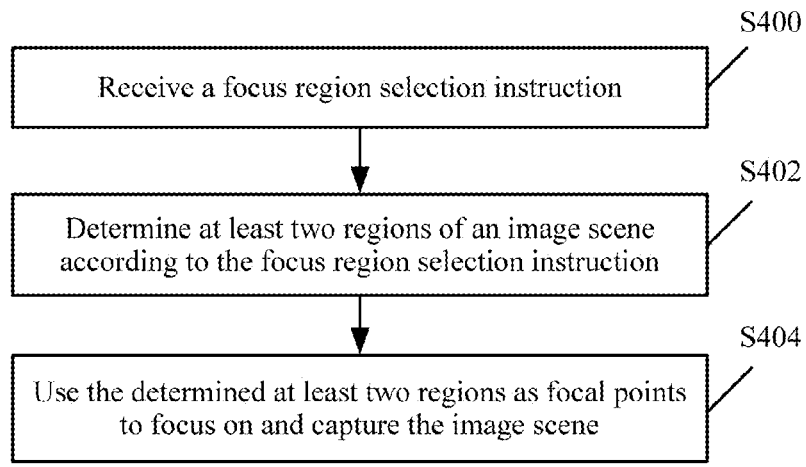
FIG. 4 is a schematic flowchart of another embodiment of a method for focusing and capturing according to an embodiment of the present disclosure.

When the electronic terminal automatically determines that at least two regions are used as focal points, step S100 may be implemented using any one of the following embodiments in FIG. 2, FIG. 3, and FIG. 4, or implemented with reference to the embodiment in FIG. 2 and the embodiment in FIG. 4, or with reference to the embodiment in FIG. 3 and the embodiment in FIG. 4.

FIG. 2 is a flowchart of a method for focusing and capturing according to an embodiment of the present disclosure, where the method includes the following steps.

Step S200: Set a quantity of focal points in an image scene to M, where M is a natural number that is greater than 1.

The electronic terminal may set M focal points according to a default solution, for example, set M focal points through automatic detection according to an actual image scene, or the user manually defines M focal points.

Step S202: Detect face regions in the image scene to obtain L face regions, where L is zero or a positive integer.

Step S204: Select the L face regions as focal points to focus on and capture the image scene when M is equal to L.

Step S206: Select the L face regions and M−L regions of interest as focal points to focus on and capture the image scene when M is greater than L.

The M−L regions of interest may be any regions of interest except the L face regions that are manually selected by the user, or regions that are automatically identified by the electronic terminal and have largest textures, training scene regions, or the like.

Step S208: Analyze areas of the L face regions when M is less than L, select face regions from the L face regions in order of first selecting a face region with a largest area and then selecting a face region with a smallest area as focal points, and perform this step repeatedly until M face regions are selected as focal points to focus on and capture the image scene after the selected face regions are precluded.

First, a face region with a largest area and a face region with a smallest area are selected as focal points when a quantity M of focal points is set to 5, and detected L face regions are 8 face regions. Then a face region with a second largest area and a face region with a second smallest area are selected as focal points. Then a face region with a third largest area is selected as a focal point. Therefore, five focal points may be selected to focus on and capture the image scene.

FIG. 3 is a flowchart of a method for focusing and capturing according to an embodiment of the present disclosure, where the method includes the following steps.

Step S300: Set a quantity of focal points in an image scene to M, where M is a natural number that is greater than 1, and M is less than or equal to a quantity of video frames obtained by a camera in an image capture process.

The camera of the electronic terminal needs to capture N video frames in a process of stretching from a far scene to a near scene when performing focusing and capturing, where N is a natural number, and N is decided by a focus time and a speed of capturing data. Therefore, the set quantity M of focal points needs to be less than or equal to N.

Step S302: Divide the image scene into A regions, where A is a positive integer.

The electronic terminal may perform region division according to content of the image scene, but is not limited to division according to content of the image scene, or may perform region division according to other conditions, and may further mark home frame numbers of pixels having a highest definition (such as a largest gradient) in each region in the A regions in the N video frames, as 0, . . . , N−1.

Step S304: Detect face regions in the image scene to obtain L face regions, where L is zero or a positive integer.

At least one image in N frames of images is selected for face detection, and more when n same home frame numbers exist in the detected L face regions, where n is a natural number, n is subtracted from an L value and an updated L value is stored.

Step S306: Select the L face regions as focal points to focus on and capture the image scene when M is equal to L.

Step S308: Analyze areas of the L face regions when M is less than L, select face regions from the L face regions in an order of first selecting a face region with a largest area and then selecting a face region with a smallest area as focal points, and perform this step repeatedly until M face regions are selected as focal points to focus on and capture the image scene after the selected face regions are precluded.

For details, reference may be made to step S208 in the embodiment in FIG. 2, and no further description is provided herein.

Step S310: Select the L face regions as focal points when M is greater than L, and select M−L regions from the A regions in descending order of areas of highest-definition regions of the A regions in each video frame as focal points to focus on and capture the image scene, where a highest-definition region comprises a region with a largest signal-to-noise ratio, or a largest gradient, or a largest DC value.

A ratio R of an area of a highest-definition region of the A regions in each video frame to an area of a single video frame may be calculated. In the A regions, a region corresponding to a largest R value is a highest-definition region with a largest in each video frame, and M−L regions corresponding to R values are selected in descending order as focal points to focus on and capture the image scene.

FIG. 4 is a flowchart of a method for focusing and capturing according to an embodiment of the present disclosure, where the method includes the following steps.

Step S400: Receive a focus region selection instruction.

The user may manually select, using a display screen of the electronic terminal, a region on which focusing and capturing need to be performed, and the electronic terminal receives the focus region selection instruction input by the user.

Step S402: Determine at least two regions of an image scene according to the focus region selection instruction.

Step S404: Use the determined at least two regions as focal points to focus on and capture the image scene.

It should be noted that, step S100 of the embodiment in FIG. 1 of the present disclosure is not limited to the foregoing implementation manner. Furthermore, all previewed images (the previewed images are images obtained in a framing process before the electronic terminal photographs the images) with different depth information in the image scene may be captured, and then it is determined, through analysis of the previewed images, that at least two regions are used as focal points to focus on and capture the image scene.

The fused image in the embodiment of the present disclosure includes at least one of the captured images, processed images obtained after registration, mapping, and cutting are performed on the captured images, or the fused image obtained after registration, mapping, cutting, and fusion are performed on the captured images.

It may be understood that, the fusing the captured images according to the focus-capture parameter in step S102 in the foregoing embodiment may include at least one of selecting a captured image according to the focus-capture parameter, or performing registration, mapping, and cutting processing on the captured images according to the focus-capture parameter, or performing registration, mapping, cutting, and fusion processing on the captured images according to the focus-capture parameter.

The focus-capture parameter includes at least one of a time value from starting of focusing to ending of focusing of each captured image, a length value of lens stretching from starting of focusing to ending of focusing of each captured image, or parameter information of a depth sensor when each captured image is focused and photographed. It may be understood that, the length value of lens stretching is a distance between a lens and an optical sensor.

When three images with different focal points are captured, the focus-capture parameter may be a time value from starting of focusing to ending of focusing of each captured image in the three captured images, namely, duration from starting of focusing analysis to ending of focusing analysis when the electronic terminal performs capture analysis on each captured image. It may be understood that, photographing may be performed according to settings after ending of focusing analysis, or photographing is performed after a photographing instruction input by the user is received.

Alternatively, the focus-capture parameter may be a length value of lens stretching from starting of focusing to ending of focusing of each captured image in three captured images, namely, a difference between a corresponding distance from a lens to an optical sensor when focusing analysis starts and a corresponding distance from the lens to the optical sensor when focusing analysis ends, namely, a length value of lens stretching from starting of focusing to ending of focusing of each captured image.

Step S102 in the foregoing embodiment may include determining, according to the focus-capture parameter, whether to fuse the captured images, and selecting an image from the captured images according to a quantity of successfully captured images when a determining result is not to fuse the captured images, and performing registration, mapping, and cutting processing on the captured images to obtain the processed images, or performing registration, mapping, cutting, and fusion on the captured images to obtain the fused image when the determining result is to fuse the captured images.

The foregoing step of determining, according to the focus-capture parameter, whether to fuse the captured images, may be implemented using any one of the following three solutions or a combination of multiple solutions.

Solution 1: Sorting the time values when the focus-capture parameter includes a time value from starting of focusing to ending of focusing of each captured image, and determining that captured images corresponding to the two time values need to be fused when an absolute value of a difference between two adjacent time values from small to large in sequence is greater than a preset threshold, or determining that captured images corresponding to the two time values do not need to be fused, and discarding a larger time value in the two time values when an absolute value of a difference between two adjacent time values from small to large in sequence is not greater than a preset threshold, and performing this step repeatedly until all captured images that need to be fused are determined.

For example, M images $I_i$ ($i=0, \ldots, M-1$) with different focal points are photographed, and an obtained time value from starting of focusing to ending of focusing of each captured image is $t_i$ ($i=0, \ldots, M-1$). Images $I_i$ and $I_j$ need to be fused when abs $(t_i-t_j) > T$, where $i=0, \ldots, M-1$, $j=0, \ldots, M-1$, and T is a preset threshold (T may be set according to an actual device). Therefore, all images that need to be fused are found according to the foregoing method, and then fusion is performed. Images I1 and I0 need to be fused when three images with different focal points are photographed and abs $(t1-t0) > T$, images I2 and I1 do not need to be fused when abs $(t2-t1) < T$, and images I3 and I1 need to be fused when abs $(t3-t1) > T$. Therefore, images I3, I1, and I0 need to be fused.

Solution 2: Sorting the length values when the focus-capture parameter includes a length value of lens stretching from starting of focusing to ending of focusing of each captured image, and determining that captured images corresponding to the two length values need to be fused when an absolute value of a difference between two adjacent length values from small to large in sequence is greater than a preset threshold, or determining that captured images corresponding to the two length values do not need to be fused, and discarding a larger length value in the two length values when an absolute value of a difference between two adjacent length values from small to large in sequence is not greater than a preset threshold, and performing this step repeatedly until all captured images that need to be fused are determined.

For example, M images $I_i$ ($i=0, \ldots, M-1$) with different focal points are photographed, and an obtained position of lens stretching from starting of focusing to ending of focusing of each captured image is $p_i$ ($i=0, \ldots, M-1$). Images $I_i$ and $I_j$ need to be fused when abs $(p_i-p_j) > D$, where $i=0, \ldots, M-1$, $j=0, \ldots, M-1$, and D is a preset threshold (D may be set according to an actual device). Therefore, all images that need to be fused are found according to the foregoing method, and then fusion is performed. Images I1 and I0 need to be fused when three images with different focal points are photographed and abs $(p1-p0) > D$, images I2 and I1 do not need to be fused when abs $(p2-p1) < D$, and images I3 and I1 need to be fused when abs $(p3-p1) > D$. Therefore, images I3, I1, and I0 need to be fused.

Solution 3: Performing fusion determining according to a parameter information of a depth sensor when each captured image is focused and photographed and when the focus-capture parameter includes the parameter information of the depth sensor when each captured image is focused and photographed, calculating depth information of focus positions of different captured images according to the depth sensor, which is similar to fusion determining according to the position of lens stretching in solution 2 and is not further described herein.

Further, in an embodiment of the present disclosure, after determining, according to the focus-capture parameter, whether to fuse the captured images, there may be three fusion and joint coding processing manners, which are hereinafter described in detail with reference to FIG. 5 to FIG. 7.

Figure 5:
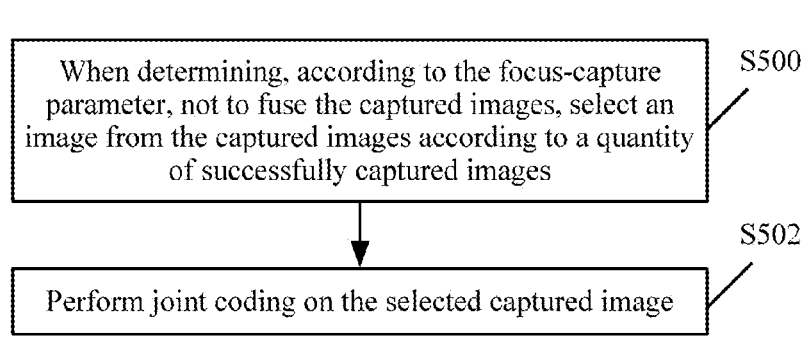
FIG. 5 is a schematic flowchart of image fusion and joint coding according to an embodiment of the present disclosure.

FIG. 5 is flowchart of image fusion and joint coding according to an embodiment of the present disclosure, including the following steps.

Step S500: Select an image from the captured images according to a quantity of successfully captured images when determining, according to the focus-capture parameter, not to fuse the captured images.

An image that is focused and successfully captured is selected when a quantity of successfully captured images that are focused and captured is 1. An image with a largest signal-to-noise ratio, or a largest gradient, or a largest DC value is selected when a quantity of successfully captured images when images are focused and captured is not 1.

That is, a best image may be selected for subsequent joint coding processing when image fusion processing is not required.

Step S502: Perform joint coding on the selected captured image.

Figure 6:
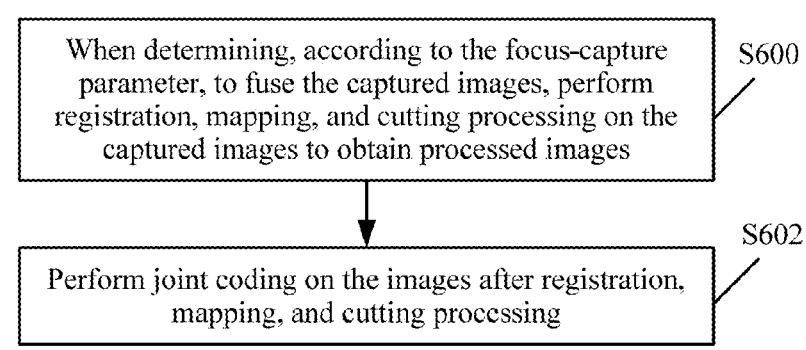
FIG. 6 is a schematic flowchart of another embodiment of image fusion and joint coding according to an embodiment of the present disclosure.

FIG. 6 is a flowchart of image fusion and joint coding according to an embodiment of the present disclosure, including the following steps.

Step S600: Perform registration, mapping, and cutting processing on the captured images to obtain processed images when determining, according to the focus-capture parameter, to fuse the captured images.

Registration processing is performed on all the obtained captured images according to a first image, where the first image is an image in all the obtained captured images, mapping processing is performed on all the captured images after registration processing, to obtain mapped images, and cutting processing is performed on all the obtained mapped images and the first image. A scale invariant feature transform (SIFT) algorithm, or a speeded-up robust features (SURF) algorithm, or corner detection in the prior art may be used for image registration to extract features of the images, and then matching is performed.

Mapping processing is performed on all the images after registration processing. Mapping is performed according to rectangular images, and a region to which no mapping is performed is filled with black pixels. During image mapping, a random sample consensus (RANSAC) algorithm in the prior art may be used to calculate a homography matrix, an image is used as a coordinate reference, and other images are mapped into a same planar coordinate system according to the homography matrix.

Cutting processing is performed on all the mapped images and the first image according to a same area, where the area is a smallest rectangular area of all the images to be cut (the area refers to a largest rectangular area of a non-filled region in the images).

Step S602: Perform joint coding on the images after registration, mapping, and cutting processing.

Figure 7:
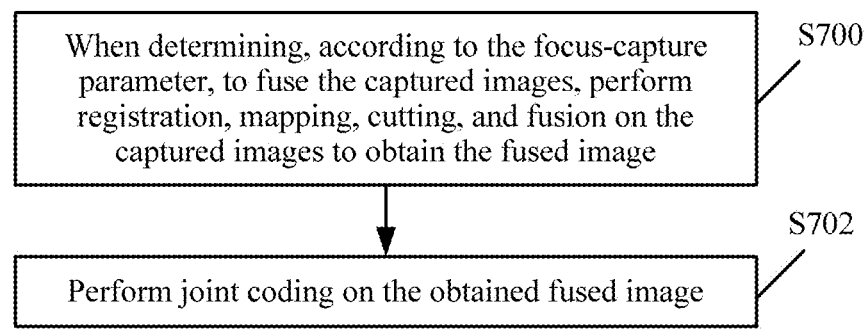
FIG. 7 is a schematic flowchart of another embodiment of image fusion and joint coding according to an embodiment of the present disclosure.

FIG. 7 is a flowchart of image fusion and joint coding according to an embodiment of the present disclosure, including the following steps.

Step S700: Perform registration, mapping, cutting, and fusion on the captured images to obtain the fused image when determining, according to the focus-capture parameter, to fuse the captured images.

Step S702: Perform joint coding on the obtained fused image.

Figure 8:
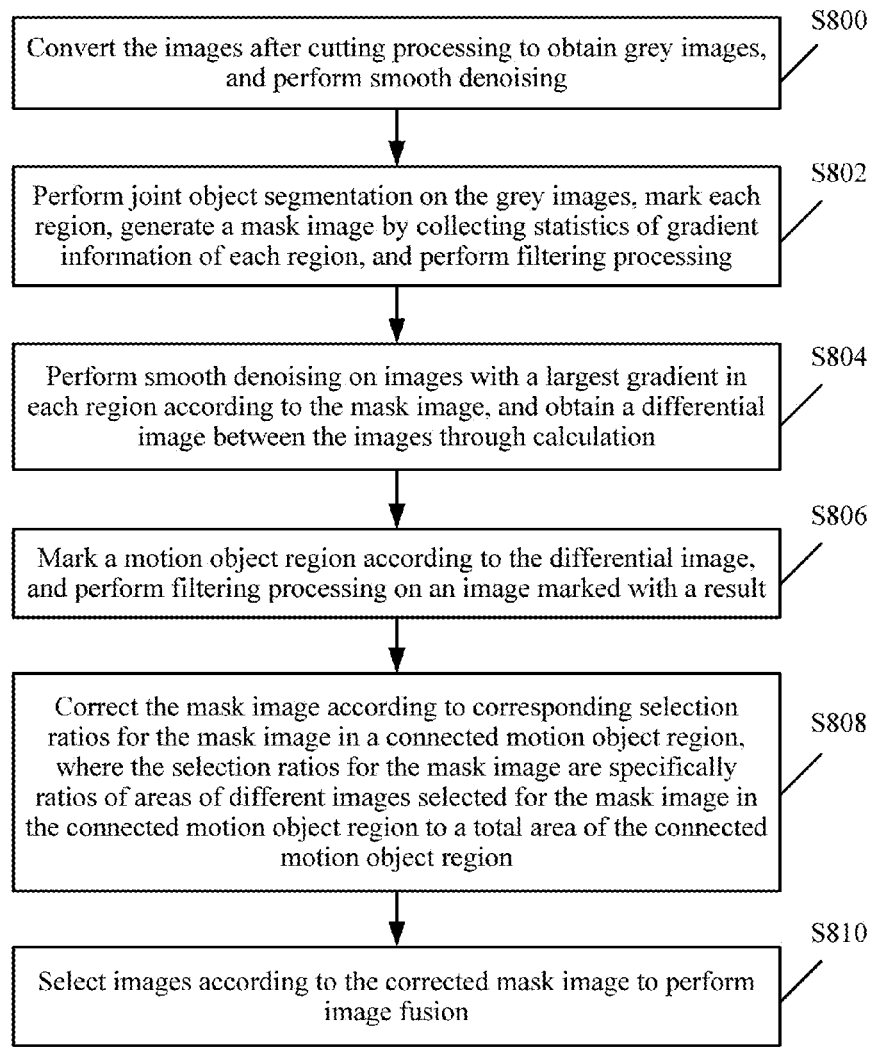
FIG. 8 is a schematic flowchart of image fusion processing according to an embodiment of the present disclosure.

For details about performing registration, mapping, and cutting on the captured images in step S700, reference may be made to step S600 in the embodiment in FIG. 6, and no further description is provided herein. For performing fusion processing on the images after registration, mapping, and cutting processing, reference may be made to the schematic flowchart of image fusion processing shown in FIG. 8 according to an embodiment of the present disclosure, where the image fusion processing includes the following steps.

Step S800: Convert the images after cutting processing to obtain grey images, and perform smooth denoising.

It is assumed that image fusion processing needs to be performed on m color images I1, I2, ..., Im after cutting processing. The color images I1, I2, ..., Im are converted, and grey images I1, I2, ..., Im are obtained, and the smooth denoising may be performed using Gaussian smooth filtering, which is not limited.

Step S802: Perform joint object segmentation on the grey images, mark each region, generate a mask image by collecting statistics of gradient information of each region, and perform filtering processing.

Joint object segmentation is performed on the grey images I1, I2, ..., Im, and each region is marked. statistics of grey values $b_{m,n}$ of the images based on block sizes are collected, where m and n are block numbers, blkSizeX is a width value of a block, and blkSizeY is a height value of a block. Then median filtering is performed to obtain $b'_{m,n}$. Then median filtering results of all the images are jointly quantized to $B_{m,n}$, where M is a total quantity of images, k is an image number, and a quantized shift is shiftBits, regions with a same quantized value are marked as a same object. The following formula may be used for processing:

$$b_{m,n} = \frac{\sum I_{i,j}}{blkSizeX * blkSizeY},$$

$$b'_{m,n} = \mathrm{median}(b_{m,n}), \text{ and}$$

$$B_{m,n} = \left(\left[\frac{\sum_{k}^{M} b'^{k}_{m,n}}{M} + (1 << (shiftBits - 1))\right] >> shiftBits\right) << shiftBits.$$

Then, statistics of gradients $G_{m,n}$ of the images I1, I2, ..., Im are collected, and then median filtering is performed on the gradients $G_{m,n}$ to obtain $G'_{m,n}$, in addition, a gradient difference $D_k$ between images is calculated, where k is an image number, and a sum $A_U^k$ of gradients of all segmented regions in each image is calculated, where U is a segmented region number. The following formulas may be used for processing:

$$G_{m,n} = \frac{\alpha * \sum (|I_{i,j} - I_{i-1,j}| + |I_{i,j} - I_{i,j-1}| + |I_{i,j} - I_{i-1,j-1}|)}{blkSizeX * blkSizeY},$$

$$G'_{m,n} = \mathrm{median}(G_{m,n}),$$

$$D_k = \sum_{m,n} (G'^{k}_{m,n} - G'^{k+1}_{m,n}), \text{ and}$$

$$A_U^k = \sum_{i,j \in U} G'^{k}_{i,j}.$$

Finally, regions with largest gradients are marked with image sequence numbers, a mask image is generated, and medium filtering is performed.

Step S804: Perform smooth denoising on images with a largest gradient in each region according to the mask image, and obtain a differential image between the images through calculation.

smooth filtering (such as Gaussian filtering) is performed on the images I1, I2, ..., Im with a largest gradient in each region according to the mask image. Then a differential image $R_k$ between the images $I_1, I_2, \ldots$ is calculated, and a binary threshold W is calculated according to a gradient difference between the images, where blkNums is a total quantity of blocks of the images, a and b are coefficients, and a and b are rational numbers and their typical values are a=2.8 and b=6. The differential image is binarized according to the threshold W. The following formula may be used for processing:

$$R_k = \text{Abs}(I_k - I_{k+1}), \text{ and}$$

$$W = \max\left(16, a*\max\left(\frac{R_k}{blkNums}\right) + b\right).$$

Step S806: Mark a motion object region according to the differential image, and perform filtering processing on an image marked with a result.

Processing may be performed based on a region of a block size. The region is marked as a motion object, and then filtering is performed on the marked image when a largest value of a binary differential image in the region exceeds a ratio (which may be set according to conditions of the electronic terminal). The filtering may considered that the current block is also a motion object region when a quantity of blocks that are marked as motion objects in a region centered on a current block exceeds a certain threshold.

Step S808: Correct the mask image according to corresponding selection ratios for the mask image in a connected motion object region, where the selection ratios for the mask image are ratios of areas of different images selected for the mask image in the connected motion object region to a total area of the connected motion object region.

An image corresponding to a largest ratio in the selection ratios for the mask image is selected to correct the mask image when it is detected that the corresponding selection ratios for the mask image in the connected motion object region are all less than a preset threshold. It is assumed that a mask image corresponding to a certain connected motion object region includes images I1, I2, and I3, and that the preset threshold is 60%.

It is detected that the corresponding selection ratios for the mask image in the connected motion object region are all less than the preset threshold when it is detected that, in the connected motion object region, the image I1 occupies 44% of the area, and the image I2 occupies 28% of the area, and the image I3 occupies 28% of the area. Therefore, the image I1 is selected to correct the mask image in the connected motion object region, that is, the entire mask image in the connected motion object region may be represented by the image I1.

The mask image in the connected motion object region is not corrected when it is detected that, in the connected motion object region, the image I1 occupies 20% of the area, and the image I2 occupies 70% of the area, and the image I3 occupies 10% of the area.

Step S810: Select images according to the corrected mask image to perform image fusion.

Figure 9:
FIG. 9 is a schematic effect diagram of motion image fusion processing according to an embodiment of the present disclosure.
Figure 9:
Figure 10:
FIG. 10 is a schematic effect diagram of another embodiment of motion image fusion processing according to an embodiment of the present disclosure.
Figure 10:

In the schematic effect diagrams of motion image fusion processing according to embodiments of the present disclosure shown in FIG. 9 and FIG. 10, the mask image is corrected through analysis of motion information of the captured images, and images are selected according to the corrected mask image for image fusion. Therefore, a motion object scene fusion problem can be solved effectively, and high-efficiency and high-quality image processing is implemented.

It should be noted that, joint coding in FIG. 5 to FIG. 7 may be implemented according to the following solution.

When it is determined, according to the focus-capture parameter, that fusion processing does not need to be performed on the images that are focused and captured, that is, a best image is selected for coding, only a quantity of images and pixel information of the best image (formats of stored images include common formats such as Joint Photographic Experts Group (JPEG), Graphics Interchange Format (GIF), and Portable Network Graphics (PNG)) are stored.

When it is determined, according to the focus-capture parameter, that fusion processing needs to be performed on the images that are focused and captured, fusion processing and coding are performed on the images that are focused and captured, and an image is output. The following two processing solutions may be available:

a: Storing a total quantity of images (namely, a quantity of images captured with different focal points), and a focus position and a focus time (or a position of lens stretching) of each image, storing pixel information of all images (including images captured with different focal points and the image after fusion processing, where formats of stored images include common formats such as JPEG, GIF, and PNG);

b: Storing a total quantity of images (namely, a quantity of images captured with different focal points), and a focus position and a focal time (or a position of lens stretching) of each image, and then using the fused image as a reference frame to perform coding on other multi-focus images (for example, similar to the H264 protocol, setting the fused image as an I-frame to perform intra-frame coding, and setting other multi-focus images as P-frames, and performing coding only by referring to the I-frame), thereby compressing a bitstream.

Further, in the embodiment in FIG. 1 of the present disclosure, displaying a coded image may include receiving a display region selection instruction, and obtaining, according to a region selected using the display region selection instruction, an image that needs to be decoded and displayed, and decoding and displaying the obtained image that needs to be decoded and displayed.

The user may perform, according to a user requirement, an operation of selecting a display region on the display screen of the electronic terminal. The electronic terminal may obtain, according to the selected region, a corresponding image that needs to be decoded and displayed after receiving the display region selection instruction. The user may select some image regions, or may select all image regions for displaying.

Still further, in the embodiment of the present disclosure, the obtaining, according to a region selected using the display region selection instruction, an image that needs to be decoded and displayed, may include finding, from the focal points, a focal point that is closest to the region selected using the display region selection instruction, and obtaining an image that is focused and captured according to the found focal point and undergoes image registration, mapping, cutting, and joint coding, or obtaining an image that is focused and captured according to the found focal point and undergoes image registration, mapping, cutting, fusion, and joint coding, as the image that needs to be decoded and displayed. Corresponding to the foregoing coding method, the following solution may be used for implementation First, a quantity of images is decoded, and it indicates that a mode of finding a best image is selected for capture and fusion when the quantity of images is 1, and in this case, only the best image is decoded and displayed, images are decoded according to a method corresponding to coding method when the quantity of images is greater than 1, and one of the following methods may be used correspondingly:

a: Decoding a quantity of images, a focus position, and a focus time (or a position of lens stretching), and decoding different images according to the user's selection during displaying. For example, decoding and displaying multi-focus images with the focus position closest to the region when the user selects a certain region, decoding and displaying the fused image when the user selects all regions (that is, selects a full definition mode); or b: Decoding a quantity of images, a focus position, and a focus time (or a position of lens stretching), then decoding the fused image (for example, similar to the method of decoding an I-frame in the H264 protocol), and then decoding multi-focus images according to the user's selection during displaying. For example, decoding and displaying multi-focus images with the focus position closest to the region (for example, similar to the method of decoding a P-frame in the H264 protocol) when the user selects a certain region, decoding and displaying the fused image when the user selects all regions (that is, selects a full definition mode).

That is, displaying a coded image in an embodiment of the present disclosure includes but is not limited to the following two modes:

1: Interactive mode: the user automatically selects local definition or full definition; and 2: Automatic cyclic play mode: local definition and/or full definition images can be played cyclically when the user selects the mode.

In implementation of the embodiments of the present disclosure, captured images are fused according to a focus-capture parameter, and when registration, mapping, cutting, and fusion are performed on the captured images according to the focus-capture parameter, a mask image is corrected through analysis of motion information of the captured images, and images are selected according to a corrected mask image for image fusion. Therefore, a motion object scene fusion problem is solved, and high-efficiency and high-quality image processing is implemented. A policy for performing fusion according to the focus-capture parameter includes directly selecting a captured image, or performing registration, mapping, and cutting on the captured images, or performing registration, mapping, cutting, and fusion on the captured images. Therefore, a problem that image processing methods for electronic terminals in the prior art are either too simple and cause a poor image processing effect, or too complex and cause low image processing efficiency, may be solved. In addition, multiple focal points are selected automatically or manually for focusing and capturing, and some or all image regions are decoded and displayed according to a user requirement such that an image processing capability of an electronic terminal is improved greatly.

The method for capturing and processing image data and the method for processing image data in the embodiments of the present disclosure are described in detail above. For better implementing the foregoing solutions in the embodiments of the present disclosure, correspondingly, the following further provides a related apparatus for implementing the foregoing solutions.

Figure 11:
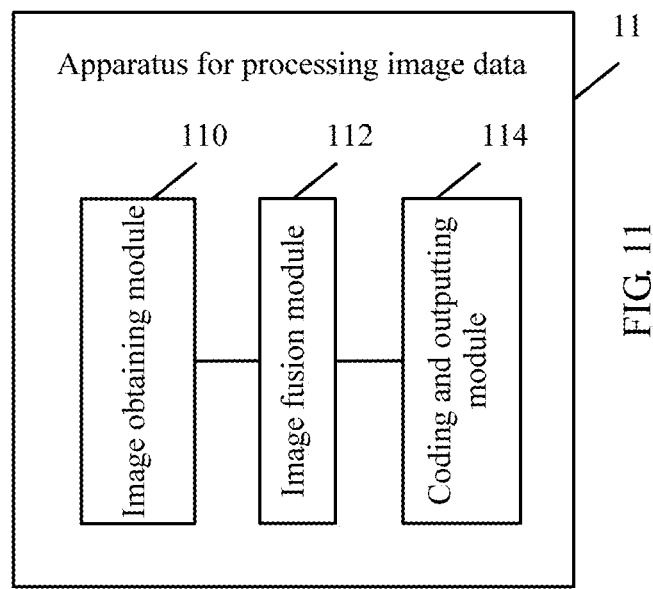
FIG. 11 is a schematic structural diagram of an apparatus for processing image data according to an embodiment of the present disclosure.

FIG. 11 is a structural diagram of an apparatus for processing image data according to an embodiment of the present disclosure. The apparatus for processing image data 11 includes an image obtaining module 110, an image fusion module 112, and a coding and outputting module 114.

The image obtaining module 110 is configured to obtain at least two captured images, where focal points of the obtained captured images are different.

The image fusion module 112 is configured to obtain a focus-capture parameter, and fuse the captured images according to the focus-capture parameter to obtain a fused image.

The coding and outputting module 114 is configured to perform joint coding on the fused image, and output an image.

The image fusion module 112 corrects a mask image through analysis of motion information of the captured images, and selects images according to a corrected mask image to perform image fusion when performing registration, mapping, cutting, and fusion on the captured images according to the focus-capture parameter.

The motion information includes a connected motion object region formed by a motion track of an object moving between the captured images, and the corrected mask image includes a sequence number of a captured image selected at each pixel in the connected motion object region after the captured images are marked with sequence numbers.

Figure 12:
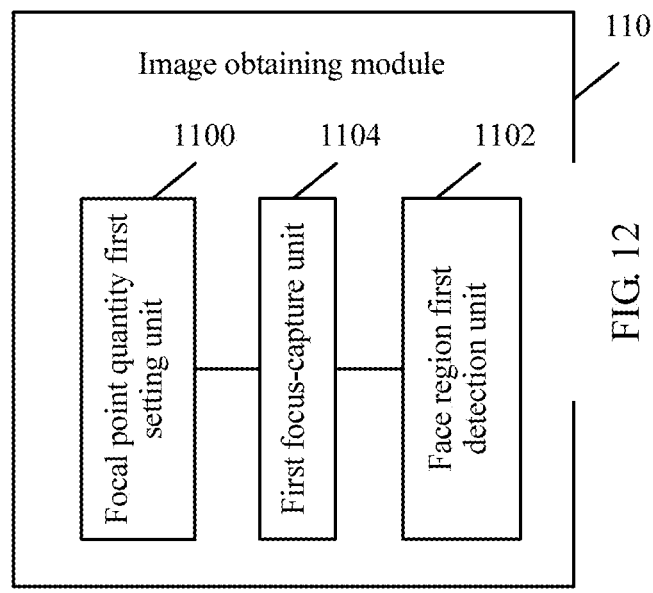
FIG. 12 is a schematic structural diagram of an image obtaining module according to an embodiment of the present disclosure.

FIG. 12 is a structural diagram of the image obtaining module according to an embodiment of the present disclosure. The image obtaining module 110 includes a focal point quantity first setting unit 1100, a face region first detection unit 1102, and a first focus-capture unit 1104.

The focal point quantity first setting unit 1100 is configured to set a quantity of focal points in an image scene to M, where M is a natural number that is greater than 1.

The face region first detection unit 1102 is configured to detect face regions in the image scene to obtain L face regions, where L is zero or a positive integer.

The first focus-capture unit 1104 is configured to when M is equal to L, select the L face regions as focal points to focus on and capture the image scene, when M is greater than L, select the L face regions and M–L regions of interest as focal points to focus on and capture the image scene, or when M is less than L, analyze areas of the L face regions, select face regions from the L face regions in order of first selecting a face region with a largest area and then selecting a face region with a smallest area as focal points, and after the selected face regions are precluded, perform this step repeatedly until M face regions are selected as focal points to focus on and capture the image scene.

Figure 13:
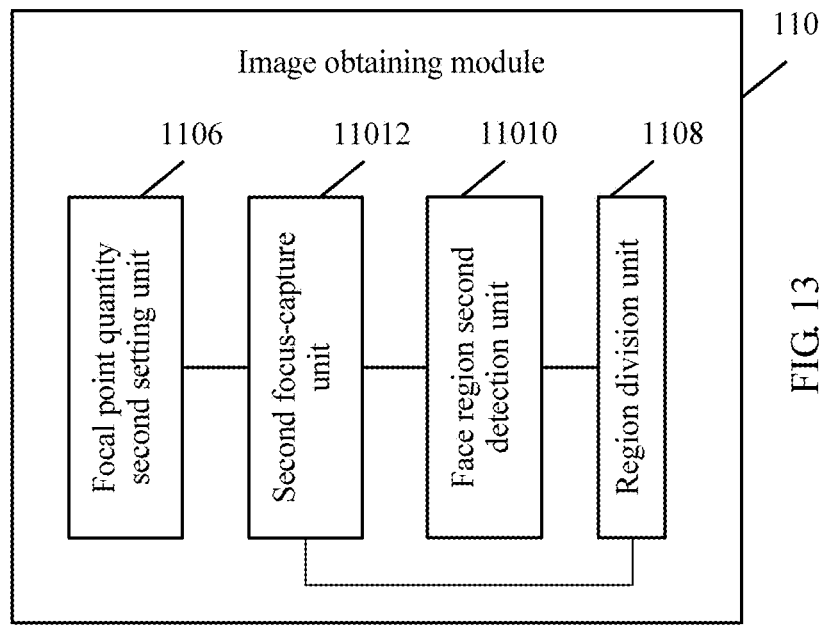
FIG. 13 is a schematic structural diagram of another embodiment of an image obtaining module according to an embodiment of the present disclosure.

FIG. 13 is a structural diagram of another embodiment of the image obtaining module according to an embodiment of the present disclosure. The image obtaining module 110 includes a focal point quantity second setting unit 1106, a region division unit 1108, a face region second detection unit 11010, and a second focus-capture unit 11012.

The focal point quantity second setting unit 1106 is configured to set a quantity of focal points in an image scene to M, where M is a natural number that is greater than 1, and M is less than or equal to a quantity of video frames obtained by a camera in an image capture process.

The region division unit 1108 is configured to divide the image scene into A regions, where A is a natural number.

The face region second detection unit 11010 is configured to detect face regions in the image scene to obtain L face regions, where L is zero or a positive integer.

The second focus-capture unit 11012 is configured to when M is equal to L, select the L face regions as focal points to focus on and capture the image scene, when M is less than L, analyze areas of the L face regions, select face regions from the L face regions in order of first selecting a face region with a largest area and then selecting a face region with a smallest area as focal points, and after the selected face regions are precluded, perform this step repeatedly until M face regions are selected as focal points to focus on and capture the image scene, or when M is greater than L, select the L face regions as focal points, and select M–L regions from the A regions in descending order of areas of highest-definition regions of the A regions in each video frame as focal points to focus on and capture the image scene, where a highest-definition region comprises a region with a largest signal-to-noise ratio, or a largest gradient, or a largest DC value.

Further, the fused image includes at least one of the following the captured images, processed images obtained after registration, mapping, and cutting are performed on the captured images, or the fused image obtained after registration, mapping, cutting, and fusion are performed on the captured images.

Figure 14:
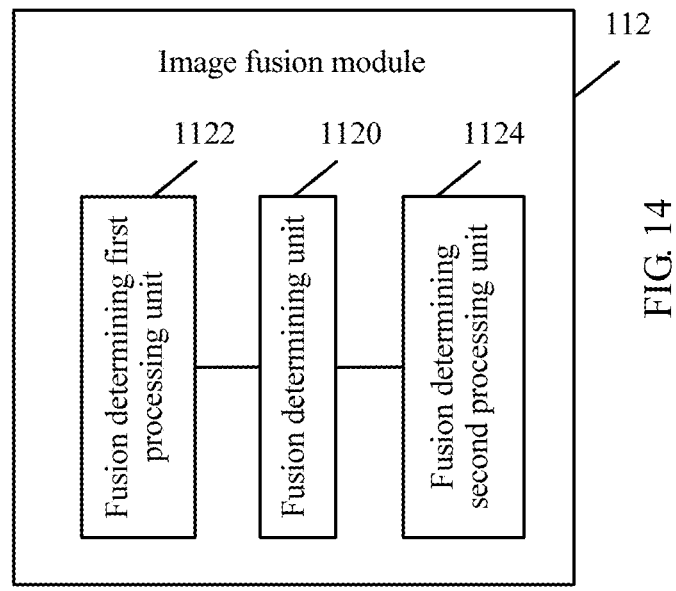
FIG. 14 is a schematic structural diagram of an image fusion module according to an embodiment of the present disclosure.

FIG. 14 is a structural diagram of the image fusion module according to an embodiment of the present disclosure. The image fusion module 112 includes a fusion determining unit 1120, a fusion determining first processing unit 1122, and a fusion determining second processing unit 1124.

The fusion determining unit 1120 is configured to determine, according to the focus-capture parameter, whether to fuse the captured images.

The fusion determining first processing unit 1122 is configured to select an image from the captured images according to a quantity of successfully captured images when a determining result is no.

The fusion determining second processing unit 1124 is configured to when a determining result is yes, perform registration, mapping, and cutting processing on the captured images to obtain the processed images, or perform registration, mapping, cutting, and fusion on the captured images to obtain the fused image.

Figure 15:
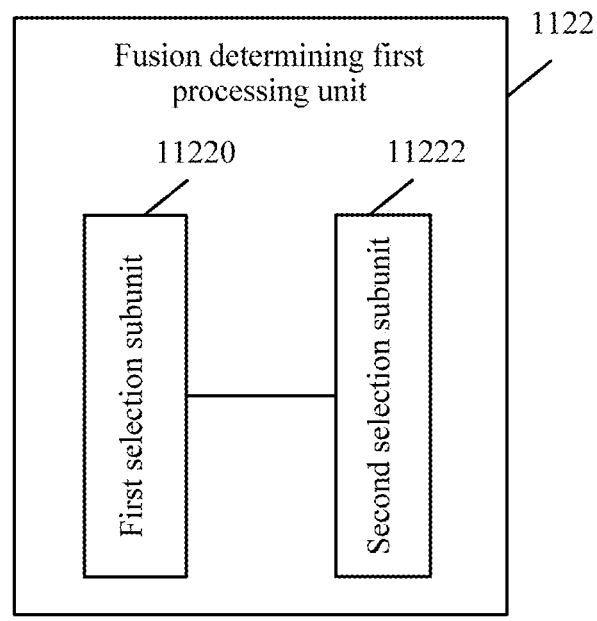
FIG. 15 is a schematic structural diagram of a fusion determining first processing unit according to an embodiment of the present disclosure.

Still further, FIG. 15 is a structural diagram of the fusion determining first processing unit according to an embodiment of the present disclosure. The fusion determining first processing unit 1122 includes a first selection subunit 11220 and a second selection subunit 11222.

The first selection subunit 11220 is configured to select, from the captured images, an image that is focused and captured successfully when the quantity of successfully captured images is 1.

The second selection subunit 11222 is configured to select, from the captured images, an image with a largest signal-to-noise ratio, or a largest gradient, or a largest DC value when the quantity of successfully captured images is not 1.

Still further, the focus-capture parameter includes a time value from starting of focusing to ending of focusing of each captured image, and the fusion determining unit 1120 is configured to sort the time values, and when an absolute value of a difference between two adjacent time values from small to large in sequence is greater than a preset threshold, determine that captured images corresponding to the two time values need to be fused, or when an absolute value of a difference between two adjacent time values from small to large in sequence is not greater than a preset threshold, determine that captured images corresponding to the two time values do not need to be fused, and discard a larger time value in the two time values, and perform this step repeatedly until all captured images that need to be fused are determined.

The focus-capture parameter includes a length value of lens stretching from starting of focusing to ending of focusing of each captured image, and the fusion determining unit 1120 is configured to sort the length values, and when an absolute value of a difference between two adjacent length values from small to large in sequence is greater than a preset threshold, determine that captured images corresponding to the two length values need to be fused, or when an absolute value of a difference between two adjacent length values from small to large in sequence is not greater than a preset threshold, determine that captured images corresponding to the two length values do not need to be fused, and discard a larger length value in the two length values, and perform this step repeatedly until all captured images that need to be fused are determined.

Figure 16:
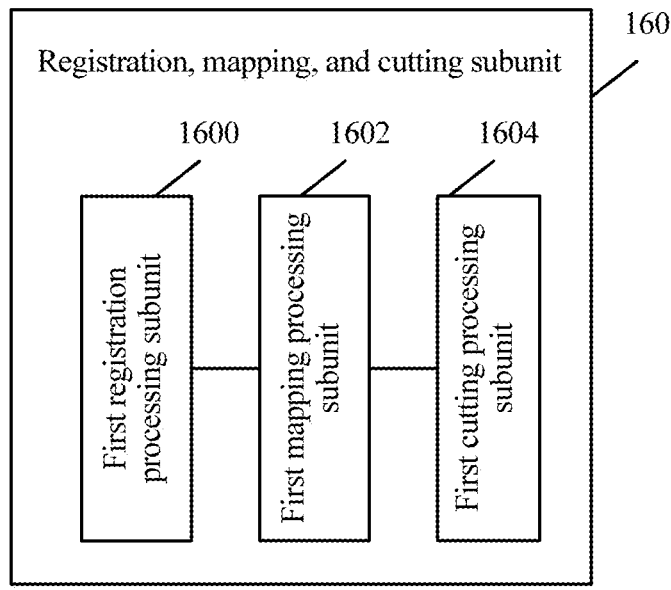
FIG. 16 is a schematic structural diagram of a registration, mapping, and cutting subunit according to an embodiment of the present disclosure.

Still further, the fusion determining second processing unit 1124 may include a registration, mapping, and cutting subunit. FIG. 16 is a structural diagram of the registration, mapping, and cutting subunit according to an embodiment of the present disclosure. The registration, mapping, and cutting subunit 160 may include a first registration processing subunit 1600, a first mapping processing subunit 1602, and a first cutting processing subunit 1604.

The first registration processing subunit 1600 is configured to perform, according to a first image, registration processing on all the captured images obtained by the image obtaining module, where the first image is an image in all the captured images.

The first mapping processing subunit 1602 is configured to perform mapping processing on all the captured images after registration processing, to obtain mapped images.

The first cutting processing subunit 1604 is configured to perform cutting processing on all the obtained mapped images and the first image.

Figure 17:
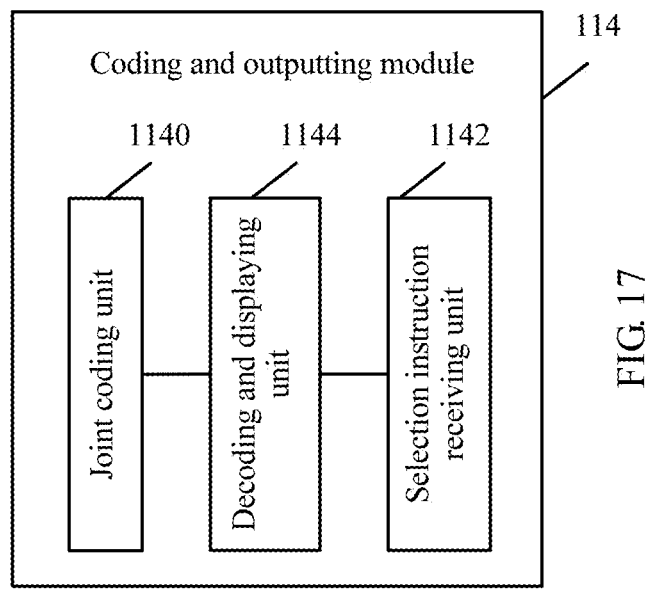
FIG. 17 is a schematic structural diagram of a coding and outputting module according to an embodiment of the present disclosure.

Still further, FIG. 17 is a structural diagram of the coding and outputting module according to an embodiment of the present disclosure. The coding and outputting module 114 includes a joint coding unit 1140, a selection instruction receiving unit 1142, and a decoding and displaying unit 1144.

The joint coding unit 1140 is configured to perform joint coding on the fused image.

The selection instruction receiving unit 1142 is configured to receive a display region selection instruction, and obtain, according to a region selected using the display region selection instruction, an image that needs to be decoded and displayed.

The decoding and displaying unit 1144 is configured to decode and display the obtained image that needs to be decoded and displayed.

Figure 18:
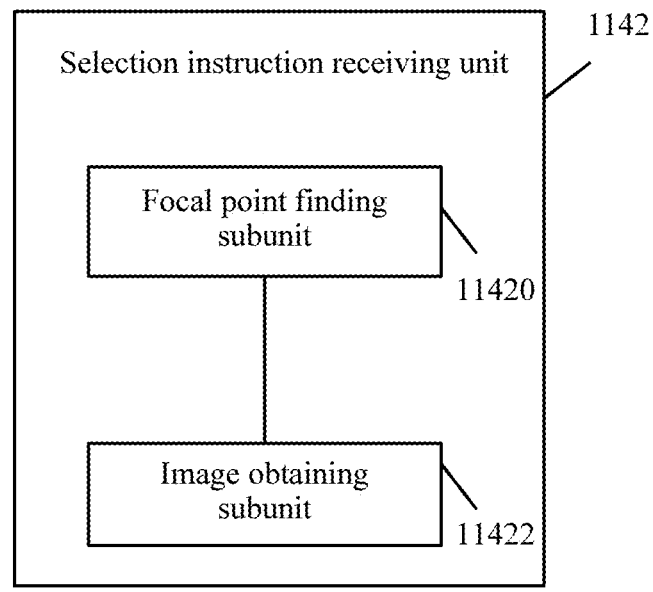
FIG. 18 is a schematic structural diagram of a selection instruction receiving unit according to an embodiment of the present disclosure.

FIG. 18 is a structural diagram of the selection instruction receiving unit according to an embodiment of the present disclosure. The selection instruction receiving unit 1142 includes a focal point finding subunit 11420 and an image obtaining subunit 11422.

The focal point finding subunit 11420 is configured to find, from the focal points of the captured images, a focal point that is closest to the region selected using the display region selection instruction.

The image obtaining subunit 11422 is configured to obtain an image that is focused and captured according to the found focal point and undergoes image registration, mapping, cutting processing, and joint coding, or obtain an image that is focused and captured according to the found focal point and undergoes image registration, mapping, cutting, fusion, and joint coding, as the image that needs to be decoded and displayed.

Figure 19:
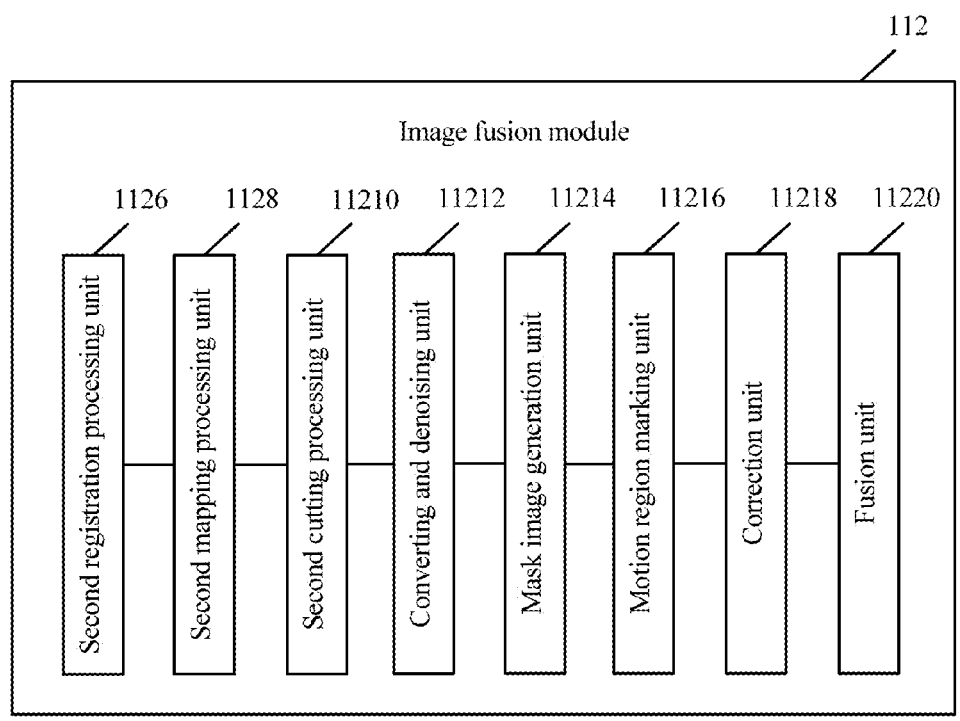
FIG. 19 is a schematic structural diagram of another embodiment of an image fusion module according to an embodiment of the present disclosure.

Still further, FIG. 19 is a structural diagram of another embodiment of the image fusion module according to an embodiment of the present disclosure. The image fusion module 112 includes a second registration processing unit 1126, a second mapping processing unit 1128, a second cutting processing unit 11210, a converting and denoising unit 11212, a mask image generation unit 11214, a motion region marking unit 11216, a correction unit 11218, and a fusion unit 11220.

The second registration processing unit 1126 is configured to perform, according to a first image, registration processing on all the captured images obtained by the image obtaining module, where the first image is an image in all the captured images.

The second mapping processing unit 1128 is configured to perform mapping processing on all the captured images after registration processing, to obtain mapped images.

The second cutting processing unit 11210 is configured to perform cutting processing on all the obtained mapped images and the first image.

The converting and denoising unit 11212 is configured to convert the images after the second cutting processing unit performs cutting processing, to obtain grey images, and perform smooth denoising.

The mask image generation unit 11214 is configured to perform joint object segmentation on the grey images, mark each region, and generate a mask image by collecting statistics of gradient information of each region.

The motion region marking unit 11216 is configured to perform smooth denoising on processed images with a largest gradient in each region according to the mask image, obtain a differential image between the processed images through calculation, and mark a motion object region according to the differential image.

The correction unit 11218 is configured to correct the mask image according to corresponding selection ratios for the mask image in a connected motion object region, where the selection ratios for the mask image are ratios of areas of different images selected for the mask image in the connected motion object region to a total area of the connected motion object region.

The fusion unit 11220 is configured to select images according to the corrected mask image to perform image fusion.

The correction unit 11218 may be configured to correct the mask image by selecting an image corresponding to a largest ratio in the selection ratios for the mask image when it is detected that the corresponding selection ratios for the mask image in the connected motion object region are all less than a preset threshold.

It should be noted that, the second registration processing unit 1126, the second mapping processing unit 1128, the second cutting processing unit 11210, the converting and denoising unit 11212, the mask image generation unit 11214, the motion region marking unit 11216, the correction unit 11218, and the fusion unit 11220 in the embodiment of the present disclosure may be located in the fusion determining second processing unit 1124.

It may be understood that, the apparatus 11 for processing image data in the embodiment of the present disclosure may be a mobile terminal such as a mobile phone, a tablet, or a camera.

It may be understood that, functions of each functional module of the apparatus 11 for processing image data in this embodiment may be implemented according to the method in the foregoing method embodiment. For a implementation process thereof, reference may be made to the related description in the foregoing method embodiment, and no further description is provided herein.

In summary, in implementation of the embodiments of the present disclosure, captured images are fused according to a focus-capture parameter, and when registration, mapping, cutting, and fusion are performed on the captured images according to the focus-capture parameter, a mask image is corrected through analysis of motion information of the captured images, and images are selected according to a corrected mask image for image fusion. Therefore, a motion object scene fusion problem is solved, and high-efficiency and high-quality image processing is implemented. A policy for performing fusion according to the focus-capture parameter includes directly selecting a captured image, or performing registration, mapping, and cutting on the captured images, or performing registration, mapping, cutting, and fusion on the captured images. Therefore, a problem that image processing methods for electronic terminals in the prior art are either too simple and cause a poor image processing effect, or too complex and cause low image processing efficiency, may be solved. In addition, multiple focal points are selected automatically or manually for focusing and capturing, and some or all image regions are decoded and displayed according to a user requirement such that an image processing capability of an electronic terminal is improved greatly.

It should be noted that, in this specification, the terms "include", "include", or their any other variant is intended to cover a non-exclusive inclusion such that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

It should be further noted that, the foregoing series of processing not only includes processing executed according to a time sequence herein, but also includes processing executed in parallel or separately and not according to a time sequence.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include a magnetic disk, an optical disc, a read-only memory (ROM), or a random access memory (RAM).

What is claimed is:

1. A method for processing image data, comprising:
   obtaining at least two captured images, wherein focal points of the obtained captured images are different;
   obtaining a focus-capture parameter;
   fusing the captured images according to the focus-capture parameter to obtain a fused image;
   performing joint coding on the fused image; and
   outputting an image,
   wherein a mask image is corrected through analysis of motion information of the captured images, and images are selected according to a corrected mask image for image fusion when registration, mapping, cutting, and fusion are performed on the captured images according to the focus-capture parameter,
   wherein the motion information comprises a connected motion object region formed by a motion track of an object moving between the captured images, and
   wherein the corrected mask image comprises a sequence number of a captured image selected at each pixel in the connected motion object region after the captured images are marked with sequence numbers.

2. The method according to claim 1, wherein obtaining the at least two captured images comprises:

setting a quantity of focal points in an image scene to M, wherein M is a natural number that is greater than 1;

detecting face regions in the image scene to obtain L face regions, wherein L is zero or a positive integer;

selecting the L face regions as focal points to focus on and capture the image scene when M is equal to L;

selecting the L face regions and M−L regions of interest as focal points to focus on and capture the image scene when M is greater than L;

analyzing areas of the L face regions when M is less than L;

selecting face regions from the L face regions in an order such that first selecting a face region with a largest area and then selecting a face region with a smallest area as focal points when M is less than L; and performing the foregoing selection of the face regions from the L face regions process repeatedly until M face regions are selected as focal points to focus on and capture the image scene after the selected face regions are precluded when M is less than L.

3. The method according to claim 1, wherein obtaining the at least two captured images comprises:

setting a quantity of focal points in an image scene to M, wherein M is a natural number that is greater than 1, and wherein M is less than or equal to a quantity of video frames obtained by a camera in an image capture process;

dividing the image scene into A regions, wherein A is a positive integer;

detecting face regions in the image scene to obtain L face regions, wherein L is zero or a positive integer;

selecting the L face regions as focal points to focus on and capture the image scene when M is equal to L;

analyzing areas of the L face regions when M is less than L;

selecting face regions from the L face regions in an order such that first selecting a face region with a largest area and then selecting a face region with a smallest area as focal points when M is less than L;

performing the foregoing selection of the face regions from the L face regions process repeatedly until M face regions are selected as focal points to focus on and capture the image scene after the selected face regions are precluded when M is less than L;

selecting the L face regions as focal points when M is greater than L;

selecting M−L regions from the A regions in descending order of areas of highest-definition regions of the A regions in each video frame as focal points to focus on when M is greater than L; and capturing the image scene when M is greater than L, wherein a highest-definition region comprises a region with a largest signal-to-noise ratio, or a largest gradient, or a largest direct current (DC) value.

4. The method according to claim 1, wherein the fused image comprises at least one of the captured images, processed images obtained after registration, mapping, and cutting are performed on the captured images, or the fused image obtained after registration, mapping, cutting, and fusion are performed on the captured images, and wherein fusing the captured images according to the focus-capture parameter comprises:

determining, according to the focus-capture parameter, whether to fuse the captured images;

selecting an image from the captured images according to a quantity of successfully captured images when a determining result is not to fuse the captured images;

performing registration, mapping, and cutting processing on the captured images to obtain the processed images when a determining result is to fuse the captured images; and performing registration, mapping, cutting, and fusion on the captured images to obtain the fused image when a determining result is to fuse the captured images.

5. The method according to claim 4, wherein selecting the image from the captured images according to the quantity of successfully captured images comprises:

selecting, from the captured images, an image that is focused and captured successfully when the quantity of successfully captured images is 1; and selecting, from the captured images, an image with a largest signal-to-noise ratio, or a largest gradient, or a largest direct current (DC) value when the quantity of successfully captured images is not 1.

6. The method according to claim 4, wherein the focus-capture parameter comprises a time value from starting of focusing to ending of focusing of each captured image, and wherein determining, according to the focus-capture parameter, whether to fuse the captured images, comprises:

sorting the time values;

determining that captured images corresponding to the two time values need to be fused when an absolute value of a difference between two adjacent time values from small to large in sequence is greater than a preset threshold;

determining that captured images corresponding to the two time values do not need to be fused when the absolute value of the difference between two adjacent time values from small to large in sequence is not greater than the preset threshold;

discarding a larger time value in the two time values; and performing the sorting, the determining, and the discarding repeatedly until all captured images that need to be fused are determined.

7. The method according to claim 4, wherein the focus-capture parameter comprises a length value of lens stretching from starting of focusing to ending of focusing of each captured image, and wherein determining, according to the focus-capture parameter, whether to fuse the captured images, comprises:

sorting the length values;

determining that captured images corresponding to the two length values need to be fused when an absolute value of a difference between two adjacent length values from small to large in sequence is greater than a preset threshold;

determining that captured images corresponding to the two length values do not need to be fused when the absolute value of the difference between two adjacent length values from small to large in sequence is not greater than the preset threshold;

discarding a larger length value in the two length values; and performing the sorting, the determining, and the discarding repeatedly until all captured images that need to be fused are determined.

8. The method according to claim 4, wherein performing registration, mapping, and cutting processing on the captured images comprises:

performing registration processing on all the obtained captured images according to a first image, wherein the first image is an image in all the obtained captured images;

performing mapping processing on all the captured images after registration processing, to obtain mapped images; and performing cutting processing on all the obtained mapped images and the first image.

9. The method according to claim 4, wherein performing joint coding on the fused image and outputting the image comprises:

performing joint coding on the fused image;

receiving a display region selection instruction, and obtaining, according to a region selected using the display region selection instruction, an image that needs to be decoded and displayed; and decoding and displaying the obtained image that needs to be decoded and displayed.

10. The method according to claim 9, wherein obtaining, according to the region selected using the display region selection instruction, the image that needs to be decoded and displayed, comprises:

finding, from the focal points of the captured images, a focal point that is closest to the region selected using the display region selection instruction; and either obtaining an image that is focused and captured according to the found focal point and undergoes image registration, mapping, cutting processing, and joint coding, or obtaining an image that is focused and captured according to the found focal point and undergoes image registration, mapping, cutting, fusion, and joint coding, as the image that needs to be decoded and displayed.

11. The method according to claim 1, wherein performing registration, mapping, cutting, and fusion on the captured images comprises:

performing registration processing on all the obtained captured images according to a first image, wherein the first image is an image in all the obtained captured images;

performing mapping processing on all the captured images after registration processing, to obtain mapped images;

performing cutting processing on all the obtained mapped images and the first image;

converting the images after cutting processing to obtain grey images, and performing smooth denoising;

performing joint object segmentation on the grey images, marking each region, and generating a mask image by collecting statistics of gradient information of each region;

performing smooth denoising on processed images with a largest gradient in each region according to the mask image;

obtaining a differential image between the processed images through calculation;

marking a motion object region according to the differential image;

correcting the mask image according to corresponding selection ratios for the mask image in a connected motion object region, wherein the selection ratios for the mask image are ratios of areas of different images selected for the mask image in the connected motion object region to a total area of the connected motion object region; and selecting images according to the corrected mask image to perform image fusion.

12. The method according to claim 11, wherein correcting the mask image according to corresponding selection ratios for the mask image in the connected motion object region comprises correcting the mask image by selecting an image corresponding to a largest ratio in the selection ratios for the mask image when detecting that the corresponding selection ratios for the mask image in the connected motion object region are all less than a preset threshold.

13. An apparatus for processing image data, comprising:
a processor; and
a non-transitory computer-readable storage medium coupled to the processor and storing programming instructions for execution by the processor, the programming instruction instructing the processor to:
obtain at least two captured images, wherein focal points of the obtained captured images are different;
obtain a focus-capture parameter;
fuse the captured images according to the focus-capture parameter to obtain a fused image;
perform joint coding on the fused image; and
output an image,
wherein a mask image is corrected through analysis of motion information of the captured images, and images are selected according to a corrected mask image to perform image fusion when performing registration, mapping, cutting, and fusion on the captured images according to the focus-capture parameter,
wherein the motion information comprises a connected motion object region formed by a motion track of an object moving between the captured images, and
wherein the corrected mask image comprises a sequence number of a captured image selected at each pixel in the connected motion object region after the captured images are marked with sequence numbers.

14. The apparatus according to claim 13, wherein the programming instruction further instructs the processor to:
set a quantity of focal points in an image scene to M, wherein M is a natural number that is greater than 1;
detect face regions in the image scene to obtain L face regions, wherein L is zero or a positive integer;
select the L face regions as focal points to focus on and capture the image scene when M is equal to L;
select the L face regions and M–L regions of interest as focal points to focus on and capture the image scene when M is greater than L;
analyze areas of the L face regions, select face regions from the L face regions in order of first selecting a face region with a largest area, and then select a face region with a smallest area as focal points when M is less than L; and
perform the setting, detecting, selecting, and analyzing repeatedly until M face regions are selected as focal points to focus on and capture the image scene.

15. The apparatus according to claim 13, wherein the programming instruction further instructs the processor to:
set a quantity of focal points in an image scene to M, wherein M is a natural number that is greater than 1, and wherein M is less than or equal to a quantity of video frames obtained by a camera in an image capture process;
divide the image scene into A regions, wherein A is a natural number;
detect face regions in the image scene to obtain L face regions, wherein L is zero or a positive integer;
select the L face regions as focal points to focus on and capture the image scene when M is equal to L;
analyze areas of the L face regions, select face regions from the L face regions in order of first selecting a face region with a largest area, and then select a face region with a smallest area as focal points when M is less than L; and perform the setting, dividing, detecting, selecting, and analyzing until M face regions are selected as focal points to focus on and capture the image scene; and select the L face regions as focal points, and select M−L regions from the A regions in descending order of areas of highest-definition regions of the A regions in each video frame as focal points to focus on and capture the image scene when M is greater than L, wherein a highest-definition region comprises a region with a largest signal-to-noise ratio, or a largest gradient, or a largest direct current (DC) value.

16. The apparatus according to claim 13, wherein the fused image comprises at least the captured images, processed images obtained after registration, mapping, and cutting are performed on the captured images, or the fused image obtained after registration, mapping, cutting, and fusion are performed on the captured images, and wherein the programming instruction further instructs the processor to:

determine, according to the focus-capture parameter, whether to fuse the captured images;

select an image from the captured images according to a quantity of successfully captured images when a determining result is to not fuse the captured images; and perform registration, mapping, and cutting processing on the captured images to obtain the processed images, or perform registration, mapping, cutting, and fusion on the captured images to obtain the fused image when the determining result is to fuse the captured images.

17. The apparatus according to claim 16, wherein the programming instruction further instructs the processor to:

select, from the captured images, an image that is focused and captured successfully when the quantity of successfully captured images is 1; and select, from the captured images, an image with a largest signal-to-noise ratio, or a largest gradient, or a largest direct current (DC) value when the quantity of successfully captured images is not 1.

18. The apparatus according to claim 16, wherein the focus-capture parameter comprises a time value from starting of focusing to ending of focusing of each captured image, and wherein the programming instruction further instructs the processor to:

sort the time values;

determine that captured images corresponding to the two time values need to be fused when an absolute value of a difference between two adjacent time values from small to large in sequence is greater than a preset threshold;

determine that captured images corresponding to the two time values do not need to be fused, and discard a larger time value in the two time values when the absolute value of the difference between two adjacent time values from small to large in sequence is not greater than the preset threshold; and perform the sorting and determining until all captured images that need to be fused are determined.

19. The apparatus according to claim 16, wherein the focus-capture parameter comprises a length value of lens stretching from starting of focusing to ending of focusing of each captured image, and wherein the programming instruction further instructs the processor to:

sort the length values;

determine that captured images corresponding to the two length values need to be fused when an absolute value of a difference between two adjacent length values from small to large in sequence is greater than a preset threshold;

determine that captured images corresponding to the two length values do not need to be fused, and discard a larger length value in the two length values when the absolute value of the difference between two adjacent length values from small to large in sequence is not greater than the preset threshold; and perform the sorting and determining repeatedly until all captured images that need to be fused are determined.

20. The apparatus according to claim 16, wherein the programming instruction further instructs the processor to:

perform joint coding on the fused image;

receive a display region selection instruction;

obtain, according to a region selected using the display region selection instruction, an image that needs to be decoded and displayed; and decode and display the obtained image that needs to be decoded and displayed.

* * * * *